United States Patent
Puthillathe

(10) Patent No.: US 10,050,907 B2
(45) Date of Patent: Aug. 14, 2018

(54) VIRTUAL PCIE BASED ETHERNET CONTROLLER FOR IN-BAND COMMUNICATION BETWEEN SERVER AND BMC

(71) Applicant: DELL PRODUCTS, LP, Round Rock, TX (US)

(72) Inventor: Chandrasekhar Puthillathe, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 114 days.

(21) Appl. No.: 15/180,564

(22) Filed: Jun. 13, 2016

(65) Prior Publication Data
US 2017/0359275 A1  Dec. 14, 2017

(51) Int. Cl.
H04L 12/931 (2013.01)
H04L 12/24 (2006.01)
G06F 13/42 (2006.01)

(52) U.S. Cl.
CPC ........ *H04L 49/351* (2013.01); *G06F 13/4282* (2013.01); *H04L 41/20* (2013.01)

(58) Field of Classification Search
CPC .................. G06F 13/4022; G06F 13/4282
See application file for complete search history.

(56) References Cited

U.S. PATENT DOCUMENTS

| | | |
|---|---|---|
| 7,457,868 B1 | 11/2008 | Guo |
| 2012/0278551 A1* | 11/2012 | Chakhaiyar ........... G06F 13/385 711/114 |
| 2015/0207746 A1 | 7/2015 | Clemm et al. |
| 2017/0185559 A1* | 6/2017 | Hunsaker ............ G06F 13/4282 |

* cited by examiner

*Primary Examiner* — Jamal Javaid
(74) *Attorney, Agent, or Firm* — Larson Newman, LLP

(57) ABSTRACT

Serial communication between a baseboard management controller and a host server may be reprogrammed for Ethernet communications. A PCIe high-speed bus, for example, may be reprogrammed as an Ethernet controller. Network addresses may then be shared for Ethernet communications between the baseboard management controller and a motherboard of the host server. Ethernet communications thus allow software applications operating in the host server to access resources associated with the baseboard management controller without relying on the Intelligent Platform Management Interface (IPMI) specification, which may be incompatible with some protocols and/or services.

17 Claims, 7 Drawing Sheets

VIRTUAL PCIE BASED ETHERNET CONTROLLER FOR IN-BAND COMMUNICATION BETWEEN SERVER AND BMC

FIELD OF THE DISCLOSURE

The present disclosure generally relates to information handling systems, and more particularly relates to a PCIe interface for an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Serial communication between a baseboard management controller and a host server may be reprogrammed for Ethernet communications. A peripheral component interconnect express (PCIe) high-speed bus, for example, may be reprogrammed as an Ethernet controller. Network addresses may then be shared for Ethernet communications between the baseboard management controller and a motherboard of the host server. Ethernet communications thus allow software applications operating in the host server to access resources associated with the baseboard management controller without relying on the Intelligent Platform Management Interface (IPMI) specification, which may be incompatible with some protocols and/or services.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
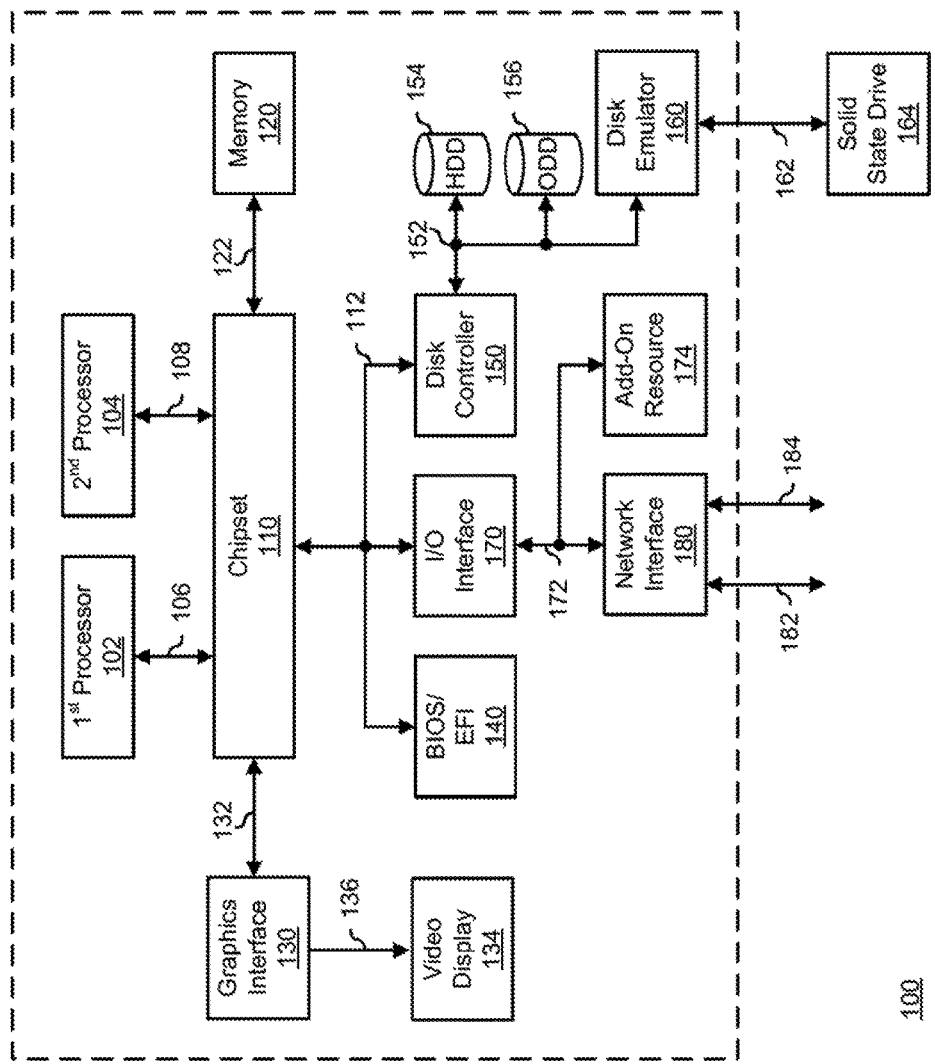
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
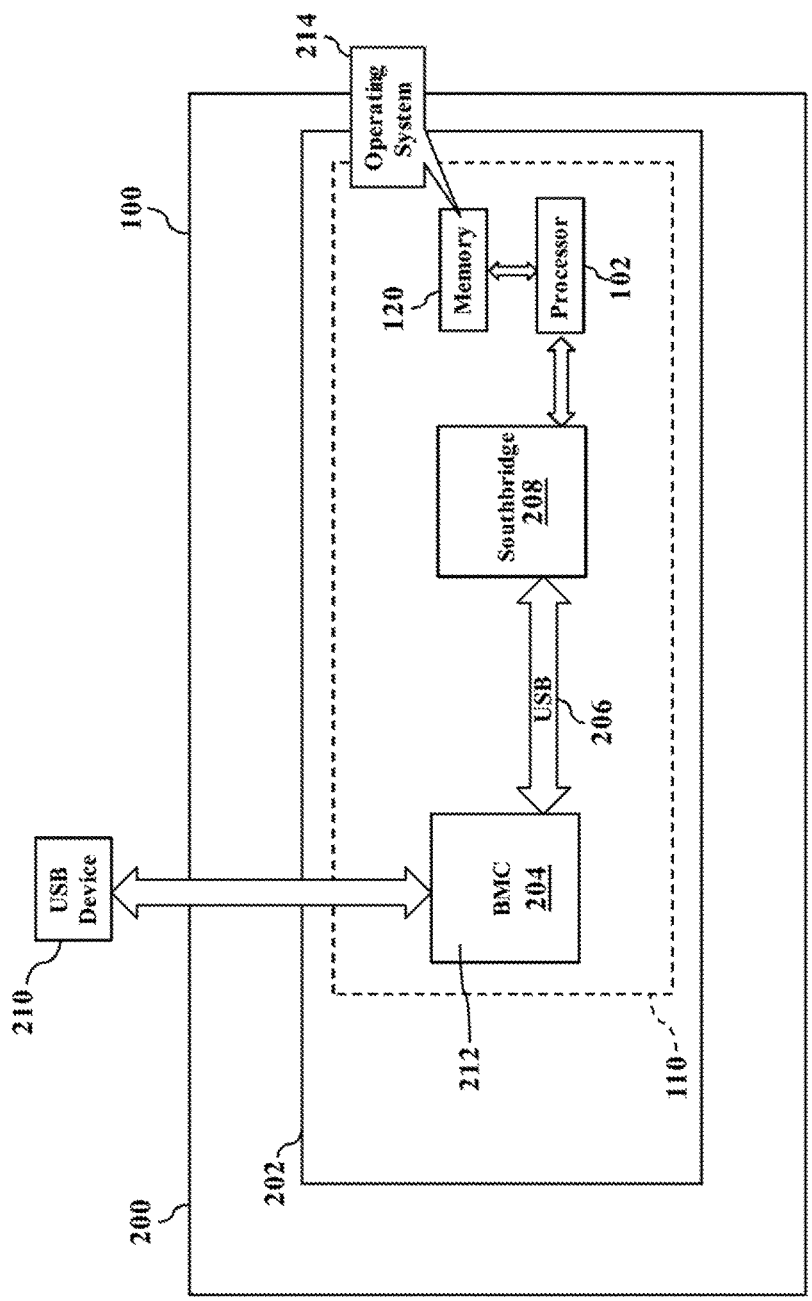
FIG. 2 is a more detailed illustration of the information handling system, according to exemplary embodiments.

FIG. 2 shows the information handling system 100 configured as a host server 200 for remote management, such as the Intelligent Platform Management Interface (IPMI) specification. That is, the host server 200 has a motherboard 202 including the chipset 110. The host server 200 also has a separate baseboard management controller (BMC) 204. As those of ordinary skill in the art understand, the baseboard management controller 204 interfaces with the motherboard 202 to provide side-band and out-of-band remote management of the host server 200. The baseboard management controller 204 has one or more physical communications links and interfaces to the motherboard 202, thus allowing the baseboard management controller 204 to process messages according to the IPMI specification. The baseboard management controller 204 may thus monitor and report the functions and performance of the host server 200 via a separate network interface. The IPMI specification is generally well known and thus need not be explained in detail.

The REDFISH® protocol, though, may be incompatible with the IPMI specification. As FIG. 2 also illustrates, a universal serial bus (USB) 206 exists between the baseboard management controller 204 and a southbridge portion 208 of the motherboard 202. The southbridge portion 208 acts as a controller hub that manages and performs input/output functions. The USB 206 allows a virtual implementation of a USB device 210 providing network storage. This USB-based virtual network device 210 could be advantageously leveraged for REDFISH® services. However, a network address 212 associated with the baseboard management controller 204 remains unknown. That is, a software application executed by an operating system 214 of the host server 200 must ordinarily send an IPMI command to the baseboard management controller 204 to discover the network address 212. If the REDFISH® protocol is predicted to replace the IPMI specification, then address discovery should be independent of IPMI commands.

Figure 3:
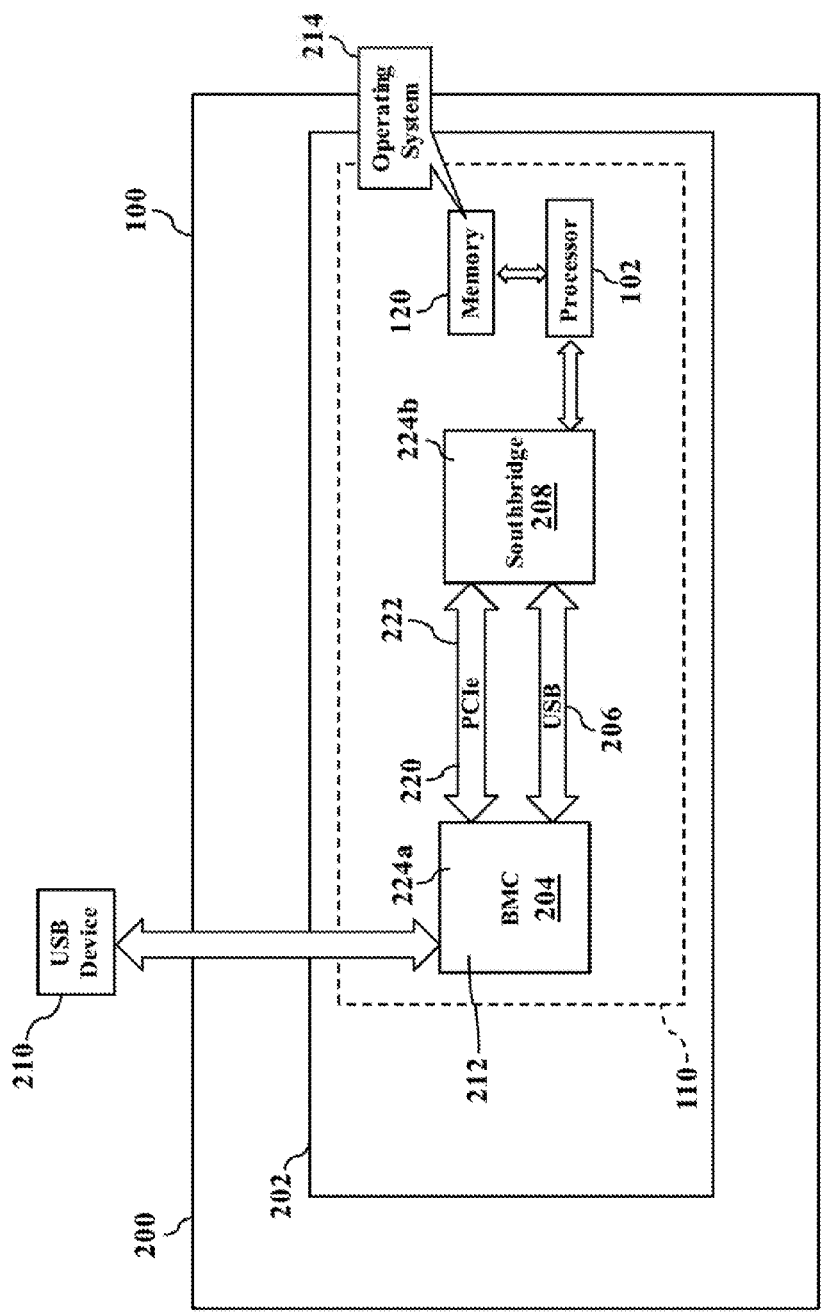
FIGS. 3-4 illustrate reprogramming, according to exemplary embodiments.
Figure 4:
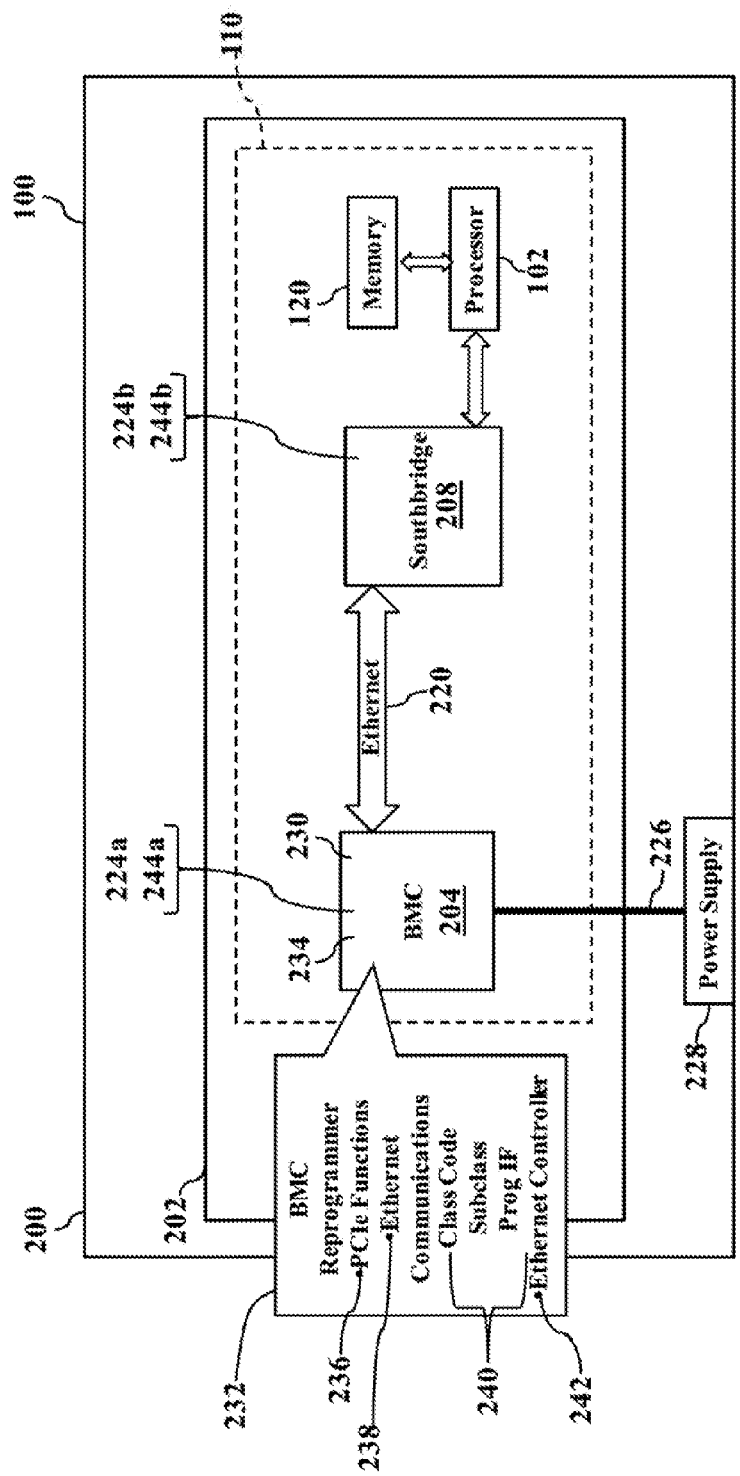

FIGS. 3-4 show reprogramming to use Ethernet communications to discover the network address 212 associated with the baseboard management controller 204. REDFISH® services, in other words, may access the USB-based virtual network storage device 210 without using the IPMI specification. FIG. 3, for example, illustrates an existing PCIe bus 220 connection between the baseboard management controller 204 and the southbridge portion 208 of the motherboard 202. The PCIe bus 220 provides high-speed serial communication 222 between the baseboard management controller 204 and the southbridge portion 208 of the motherboard 202. The baseboard management controller 204 thus has a PCIe interface 224a to the PCIe bus 220, and the motherboard 202 has a corresponding PCIe interface 224b to the PCIe bus 220.

FIG. 4, though, illustrates a reprogramming. When the baseboard management controller 204 receives electrical power 226 (generated by a power supply 228), the baseboard management controller 204 has a local processor 230 (such as μP), application specific integrated circuit (ASIC), or other component that executes a BMC Reprogrammer application 232 stored in a local memory 234. The BMC Reprogrammer application 232 instructs the local processor 230 to perform operations, such as reprogramming PCIe functions 236 into Ethernet communications 238. The BMC Reprogrammer application 232, for example, changes one or more configuration parameters 240 associated with the PCIe bus 220 to match values ordinarily associated with an Ethernet controller 242. The PCI Specification defines an organization of a 256-byte Configuration Space register and imposes a specific template. Exemplary embodiments may thus change pre-defined data fields in the Configuration Space register to specify the device function(s) associated with the Ethernet controller 242. For example, exemplary embodiments may change a Class Code, a Subclass, and a Programming Interface (or Prog IF) as:

| Class Code | Subclass | Prog IF |
|---|---|---|
| 0x02 | 0x00 | 0x00 |

These values are predefined by the PCI Specification as Ethernet controller functions. The baseboard management controller 204 may thus reconfigure the PCIe bus 220 and either one or both of the PCIe interfaces 224a and 224b as, respectively, Ethernet controllers 244a and 244b. The read-only registers in the Configuration Space are thus reprogrammed to identify a device type, a device function, and a register-level programming interface normally associated with Ethernet controller functions.

Figure 5:
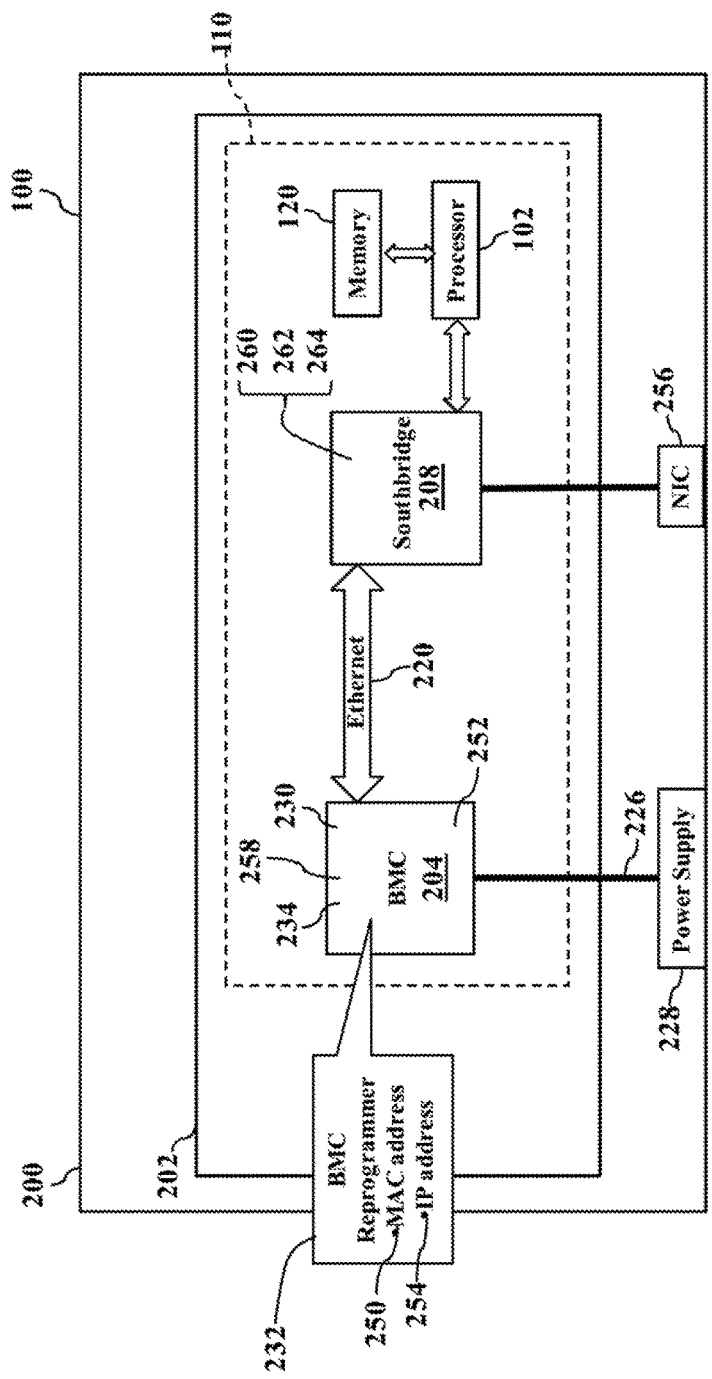
FIG. 5 illustrates addressing, according to exemplary embodiments.

FIG. 5 illustrates addressing, according to exemplary embodiments. Once the Ethernet controller functions are reprogrammed (as explained with reference to FIG. 4), exemplary embodiments may also determine network addresses that correspond to the baseboard management controller 204 and to the host server 200. As those of ordinary skill in the art understand, the baseboard management controller 204 may be associated with a dedicated media access control (MAC) address 250 (perhaps via a dedicated network interface controller 252) and/or an Internet Protocol address 254 (perhaps via a shared local area network interface (NIC)) 256 in the host server 200). These addresses 250 and 254 may be written to the local memory 234 of the baseboard management controller 204. The BMC Reprogrammer application 232 may thus define a BMC-side Ethernet interface 258 using the MAC address 250 and/or the Internet Protocol address 254. Exemplary embodiments may also define a corresponding host-side Ethernet interface 260 using the MAC address 262 and/or the Internet Protocol address 264 associated with the motherboard 202 and/or the host server 200. Exemplary embodiments may thus define the network parameters for both the baseboard management controller 204 and for the host server 200 as endpoints.

Figure 6:
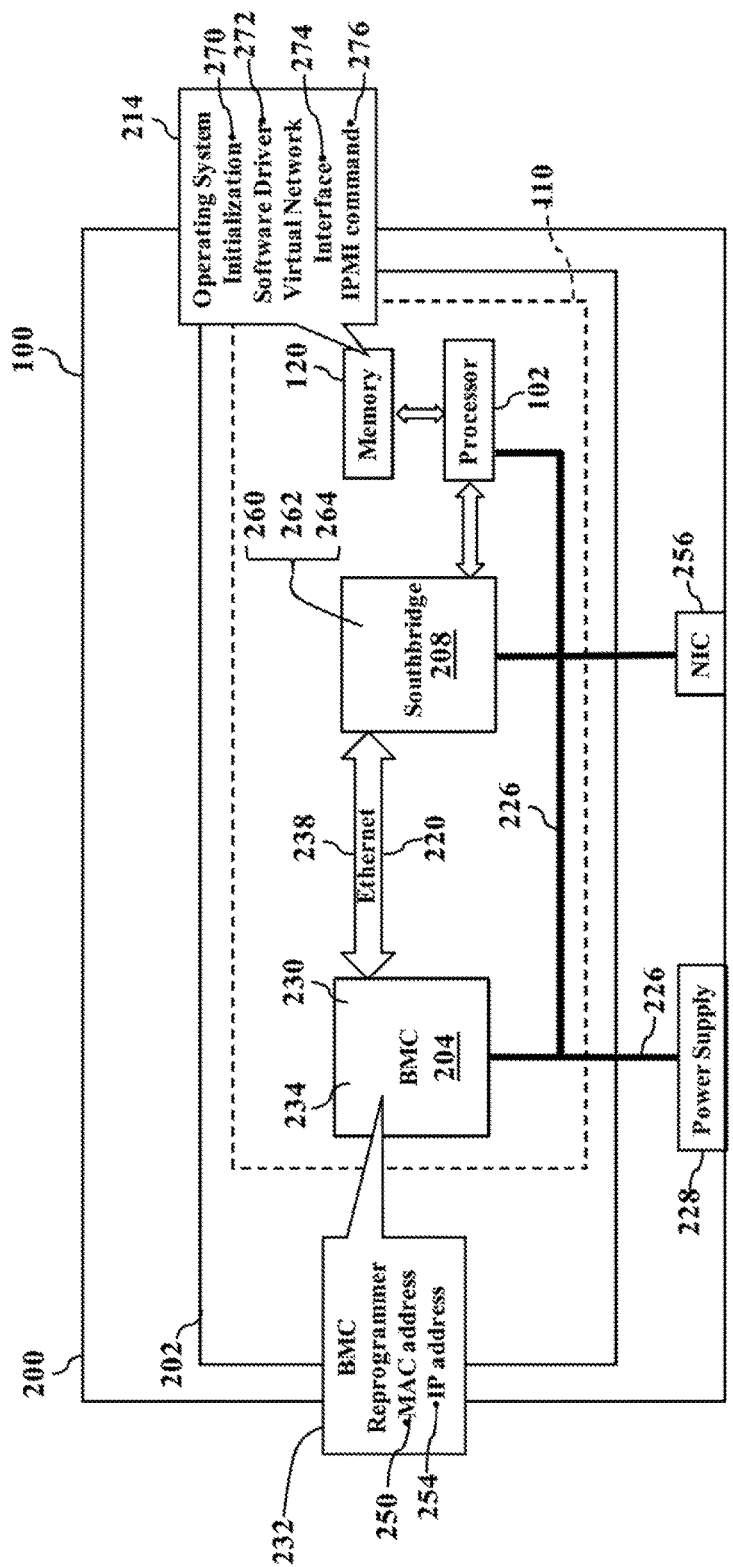
FIG. 6 illustrates initialization, according to exemplary embodiments.

FIG. 6 illustrates initialization, according to exemplary embodiments. When the host processor 102 in the motherboard 202 also receives the electrical power 226 (via the power supply 228), the host processor 102 begins execution or initialization 270 of the operating system 214. A software driver 272 detects a PCIe device (such as the PCIe bus 220) and creates a virtual network interface 274 in the local memory 120 of the host server 200 using the network parameters (e.g., the BMC-side MAC address 250 and/or the Internet Protocol address 254 and the host-side MAC address 262 and/or the Internet Protocol address 264). The virtual network interface 274 may be created as a point-to-point connection with a target address defined or read from the PCIe device's extended configuration space. The virtual network interface 274 may thus use the Ethernet communications 238 to communicate with the baseboard management controller 204.

Figure 7:
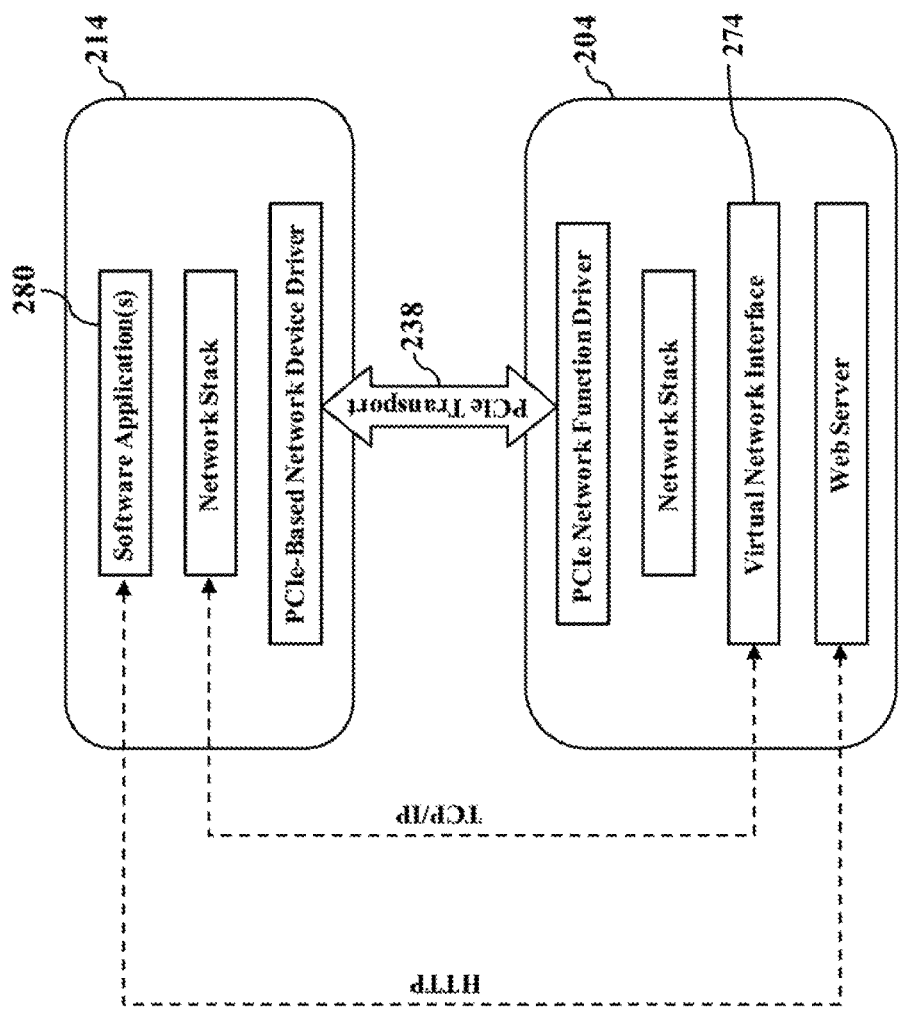
FIG. 7 illustrates REDFISH® service discovery, according to exemplary embodiments.

FIG. 7 illustrates REDFISH® service discovery, according to exemplary embodiments. Now that the virtual network interface 270 is established, REDFISH® clients may discover the network addresses that correspond to the baseboard management controller 204 and to the host server 200 (such as the BMC-side MAC address 250 and/or the Internet Protocol address 254 and the host-side MAC address 262 and/or the Internet Protocol address 264, as illustrated in FIGS. 5-6). Suppose a REDFISH® client application 280 stores in the memory 120 of the host server 200 (best illustrated in FIG. 6). Because the virtual network interface 270 is now defined, the network parameters for both the baseboard management controller 204 and for the host server 200 are now known. The REDFISH® client application 280 may communicate with the baseboard management controller 204 and access any resources. For example, the REDFISH® client application 280 may access the virtual USB storage device (illustrated as reference numeral 210 in FIG. 3) via a USB interface to the universal serial bus (USB) 206. Exemplary embodiments thus make available a high speed channel (up to 4 Gbps) between the host server 200 and the baseboard management controller 204, when conventionally a USB-NIC is limited to 480 Mbps. Those of ordinary skill in the art recognize the REDFISH® standard that uses the Representational State Transfer (REST) architecture interface to perform remote out of band systems management. Exemplary embodiments, though, are applicable to any protocol or service.

Exemplary embodiments may thus emulate a PCIe-based network controller. Reprogramming provides a functional REDFISH® interface between the host server 200 and the baseboard management controller 204 without hardware changes. This functional REDFISH® interface can emerge as a standardized network interface between native OS applications and BMCs. OS applications can be integrated natively with existing hardware and also perform better. REDFISH® clients can be aware of the endpoint address (such as the BMC-side MAC address 250 and/or the Internet Protocol address 254) associated with the baseboard management controller 204 without requiring any vendor specific IPMI commands as existing today.

Exemplary embodiments may packetize. The information handling system 100 (such as the host server 200 and/or the baseboard management controller 204) has one or more of the network interfaces 180 (illustrated in FIG. 1) to a local area network and/or a wide area network (such as the Internet). The network interface 180 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability.

Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the World Wide Web), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    establishing, by a baseboard management controller, serial communication via an interface to a bus, the bus connecting the baseboard management controller to a host server;
    reprogramming, by the baseboard management controller, the interface to the bus as an Ethernet controller; and
    establishing, by the baseboard management controller, an Ethernet interface for Ethernet communication with the host server via the interface to the bus reprogrammed as the Ethernet controller.

2. The method of claim 1, further comprising determining a network address associated with the host server.

3. The method of claim 1, further comprising determining a network address associated with the baseboard management controller.

4. The method of claim 1, further comprising establishing a virtual network interface in response to the interface to the bus reprogrammed as the Ethernet controller.

5. The method of claim 1, further comprising initializing an operating system.

6. The method of claim 1, further comprising determining network addresses associated with the baseboard management controller and with the host server in response to the interface to the bus reprogrammed as the Ethernet controller.

7. An information handling system, comprising:
   a processor; and
   a memory device accessible to the processor, the memory device storing instructions that when executed cause the processor to perform operations, the operations comprising:
   establishing serial communication via a peripheral component interconnect express interface between a baseboard management controller and a host server;
   reprogramming the peripheral component interconnect express interface as an Ethernet controller;
   establishing Ethernet communication between the baseboard management controller and the host server via the peripheral component interconnect express interface reprogrammed as the Ethernet controller; and
   establishing a virtual network interface in response to the peripheral component interconnect express interface reprogrammed as the Ethernet controller.

8. The system of claim 7, wherein the operations further comprise determining a network address associated with the host server.

9. The system of claim 7, wherein the operations further comprise determining a network address associated with the baseboard management controller.

10. The system of claim 7, wherein the operations further comprise establishing an Ethernet interface in response to the peripheral component interconnect express interface reprogrammed as the Ethernet controller.

11. The system of claim 7, wherein the operations further comprise initializing an operating system.

12. The system of claim 7, wherein the operations further comprise determining network addresses associated with the baseboard management controller and with the host server in response to the peripheral component interconnect express interface reprogrammed as the Ethernet controller.

13. A memory device storing instructions that when executed cause a processor to perform operations, the operations comprising:
   establishing serial communication via a peripheral component interconnect express interface between a baseboard management controller and a host server;
   reprogramming the peripheral component interconnect express interface as an Ethernet controller; and
   establishing an Ethernet interface for Ethernet communication between the baseboard management controller and the host server via the peripheral component interconnect express interface reprogrammed as the Ethernet controller.

14. The memory device of claim 13, wherein the operations further comprise determining a network address associated with the host server.

15. The memory device of claim 13, wherein the operations further comprise determining a network address associated with the baseboard management controller.

16. The memory device of claim 13, wherein the operations further comprise establishing a virtual network interface in response to the peripheral component interconnect express interface reprogrammed as the Ethernet controller.

17. The memory device of claim 13, wherein the operations further comprise initializing an operating system.

\* \* \* \* \*